(No Model.)
S. L. SLY.
LANTERN BRACKET.
No. 575,857.
Patented Jan. 26, 1897.
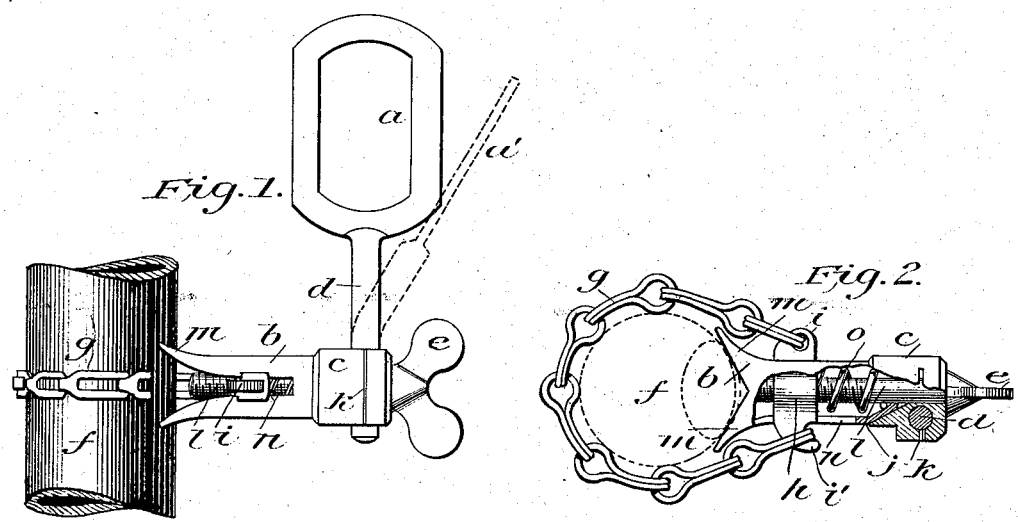
Witnesses.
Inventor:
Sidney L. Sly

UNITED STATES PATENT OFFICE.

SIDNEY L. SLY, OF JORDAN, MINNESOTA.

LANTERN-BRACKET.

SPECIFICATION forming part of Letters Patent No. 575,857, dated January 26, 1897.

Application filed February 10, 1896. Serial No. 578,793. (No model.)

*To all whom it may concern:*

Be it known that I, SIDNEY L. SLY, of Jordan, Scott county, Minnesota, have invented certain new and useful Improvements in Lantern-Brackets, of which the following is a specification.

My invention relates to lantern-brackets designed, primarily, for use on bicycles for supporting the lantern in any desired position on the frame of the bicycle; and the object I have in view is to provide a bracket which while forming a secure support for the lantern may be readily attached to any part of the frame and as easily removed whenever desired.

A further object is to provide a bracket which will not mar or deface the enamel on the frame of the machine.

A further object is to provide a bracket which will be universal in its application, being adjustable, and thereby adapted for use on any size of tubing; and a still further object is to provide a lantern-bracket that may be secured to a vehicle or boat and placed in any position where it is desired to support a lantern.

My invention consists generally in the combination, with a tubular portion and a threaded rod arranged therein, of a nut provided on the threaded rod, a chain secured to said nut, and a standard or bracket provided at the outer end of said tubular portion, all as hereinafter described, and particularly pointed out in the claims.

In the accompanying drawings, forming part of this specification, Figure 1 is a side elevation of the device attached to a bicycle-frame. Fig. 2 is a plan view of the same, the tubular portion being broken away to show the interior mechanism.

In the drawings, $f$ represents a portion of the bicycle-frame of the usual size, and $b$ a short tubular portion provided at one end with the spreading legs $m$, adapted to bear against the surface of the frame $f$ or any other object to which the bracket may be secured. The tubular portion $b$ is provided in its side walls with the slots $n$, extending a little more than one-half the length of the tube. As shown in Fig. 2, the tubular portion $b$ is provided at its outer end with the cone-bearing surfaces $j$, against which the friction-washer $c$ bears when the device is in use.

Within the tubular portion $b$ I provide a threaded rod $l$, having the thumb-nut $e$ at its outer end and carrying the sliding nut $h$ on its threaded portion, said nut being provided with the lugs $i$ and $i'$, which extend through the slots $n$, provided in the tubular portion $b$, as heretofore described. To the lug $i$ is secured one end of the chain or cord, while the lug $i'$ is provided with a hook to engage the opposite end of the chain or metal band after it has been passed around the bicycle-frame or other object to which the bracket is to be attached.

A band of leather or cloth or other suitable material may be placed beneath the chain or cord to prevent its scratching the enamel on the frame of the bicycle.

The friction-washer $c$ is provided with a transverse slot $k$, extending partially through the washer, and a hole is provided in one side of the washer to receive the shank $d$ of the bracket $a$. The shank $d$ is preferably bent slightly, so that when a lantern is suspended upon the part $a$ the light may be thrown upon the ground directly in front of the wheel or in any other desired direction, as the standard $d$ turns freely in the opening in the washer $c$ before the device has been clamped in position. The washer-rod $l$ extends through the friction-washer $c$, and it is evident that when the thumb-nut $e$ comes in contact with the outer surface of the friction-washer $c$ if the operator continues to turn the thumb-nut the sliding nut $h$ will move on the rod $l$ toward the outer end of the tubular portion $b$, and the chain or metal band $g$ having been passed around the frame of the bicycle will be clamped securely thereon, and the pressure on the friction-washer $c$ will clamp the shank or standard $b$ securely within the opening provided in said washer. By means of the spring $o$ provided on the threaded rod $l$ the sliding nut $h$ will be held in position until such time as it is desired to place the device upon the bicycle or other vehicle on which it may be desired to attach the lantern.

Having thus described my invention, I claim as new and desire to secure by Letters Patent—

1. In a device of the class described, the combination, with the shell or casing, of the thumb-bolt arranged therein, the sliding nut carried by said bolt, and a chain or metal band having its opposite ends attached to said sliding nut, for the purpose set forth.

2. In a device of the class described, the combination, with the thumb-bolt of the nut arranged thereon, the chain or cord connected to said nut, the friction-washer carried by said thumb-bolt, and the standard or bracket supported by said friction-washer, substantially as described.

3. In a device of the class described, the combination, with the shell or casing, having the spreading legs $m$ and slots $n$, the thumb-bolt within said casing, the nut carried by said bolt and having lugs extending through said slots $n$, a chain or metal band having its ends attached to said lugs a friction-washer carried by said thumb-bolt and provided with a transverse slot, and the standard supported within an opening provided in said washer, substantially as described.

4. In a device of the class described, the combination, with the casing or shell, the thumb-bolt within the same, the friction-washer, the standard supported within an opening provided in said washer, the sliding bolt provided on said thumb-bolt, the chain or metal band having its ends attached to said nut and adapted to clasp the bicycle-frame, whereby when said thumb-bolt is operated, said chain or metal band will be tightened and said standard clamped simultaneously, substantially as described.

5. In a device of the class described, the combination, with the shell or casing, of the thumb-bolt within the same, the chain or metal band having its ends attached to said nut and adapted to encircle the bicycle-frame, a friction-washer carried by said thumb-bolt, and a spring carried by said thumb-bolt and arranged between said nut and said friction-washer, for the purpose set forth.

SIDNEY L. SLY.

Witnesses:
F. C. IRWIN,
A. J. IRWIN.